(12) United States Patent
Suzuki et al.

(10) Patent No.: US 11,016,828 B2
(45) Date of Patent: May 25, 2021

(54) TASK SUPPORT SYSTEM AND METHOD

(71) Applicant: Hitachi, Ltd., Tokyo (JP)

(72) Inventors: Keita Suzuki, Tokyo (JP); Akihiro Urano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/812,731

(22) Filed: Mar. 9, 2020

(65) Prior Publication Data

US 2021/0081262 A1     Mar. 18, 2021

(30) Foreign Application Priority Data

Sep. 17, 2019   (JP) .............................. JP2019-168723

(51) Int. Cl.
*G06F 9/54*     (2006.01)
*G06F 9/48*     (2006.01)

(52) U.S. Cl.
CPC ............ *G06F 9/542* (2013.01); *G06F 9/4843* (2013.01)

(58) Field of Classification Search
None
See application file for complete search history.

(56) References Cited

U.S. PATENT DOCUMENTS

| | | | | |
|---|---|---|---|---|
| 2014/0350964 | A1* | 11/2014 | Rhodes ................. | G16H 40/20 705/3 |
| 2016/0378855 | A1* | 12/2016 | Roberts ................ | G06F 16/248 707/723 |
| 2018/0053207 | A1* | 2/2018 | Modani .............. | G06Q 30/0244 |
| 2019/0081871 | A1* | 3/2019 | Nazar ................. | H04L 43/0823 |
| 2020/0184072 | A1* | 6/2020 | Ikeda ..................... | G06N 20/00 |
| 2020/0334093 | A1* | 10/2020 | Dubey ................. | G06F 11/079 |

FOREIGN PATENT DOCUMENTS

JP         2003186704 A      7/2003

* cited by examiner

*Primary Examiner* — Charles E Anya
(74) *Attorney, Agent, or Firm* — Mattingly & Malur, PC

(57) ABSTRACT

A task support system and method improve an operator's handling of an unknown new event. The task support system and method handle an event that occurred in a management target, in relation to an unknown event, and one or more event types are evaluated as event type candidates. A first event type candidate group having a high confidence score among the evaluated event type candidates is extracted and a first candidate confidence score is calculated from each confidence score of each event type candidate of the first event type candidate group. A first candidate importance is calculated from first importance held by an event type corresponding to each event type candidate belonging to the first event type candidate group and information other than the first importance. A diagram corresponding to each event is represented in a coordinate space by using the first candidate confidence score and the first candidate importance.

12 Claims, 18 Drawing Sheets

FIG.3

EVENT TYPE LIST 31

| EVENT TYPE ID | MESSAGE TEMPLATE | ... | IMPOR-TANCE |
|---|---|---|---|
| 1000 | APPLICATION SERVER (***) STOPPED ABNORMALLY | ... | 90 |
| 1001 | THERE IS NO MORE PRINTER PAPER. PRINTING HAS BEEN STOPPED. | ... | 40 |
| 1002 | USE OF DISK SPACE HAS EXCEEDED ***%. PLEASE CONSIDER ADDING A DISK. | ... | 30 |
| 1003 | REMAINING PRINTER PAPER IS LESS THAN ***%. | ... | 10 |
| ... | ... | ... | ... |

EVENT TABLE 32

| EVENT ID | MESSAGE | ... |
|---|---|---|
| 0001 | APPLICATION SERVER (Nagoya) STOPPED ABNORMALLY | ... |
| ... | ... | ... |

ALLOCATION RESULT TABLE 33

| EVENT ID | EVENT TYPE ID | CERTAINTY FACTOR |
|---|---|---|
| 0001 | 1000 | 90 |
| 0001 | 1001 | 40 |
| 0001 | 1003 | 30 |
| ... | ... | ... |

| CATEGORIZATION ||||
|---|---|---|---|
| CATEGORY | EVENT LIST ID | IMPORTANCE | CERTAINTY FACTOR |
| IMPORTANCE "LOW" | 1000 | 80 | 90 |
| IMPORTANCE "LOW" | 1001 | 15 | 15 |
| | ... | | |
| IMPORTANCE "HIGH" | 1500 | 95 | 30 |
| | ... | ... | ... |

FIG. 10B

| COMPUTATION RESULT |||
|---|---|---|
| CATEGORY | CALCULATION FORMULA | CONTENT RATE (%) |
| IMPORTANCE "HIGH" | 10/(10+15+...+10+...)*100 | 8.25 |
| IMPORTANCE "MEDIUM" | (...)/(10+15+...+10+...)*100 | 32.00 |
| IMPORTANCE "LOW" | (10+15+...)/(10+15+...+10+...)*100 | 59.75 |

FIG. 13A

| CATEGORY COEFFICIENT ||
|---|---|
| CATEGORY | COEFFI-CIENT |
| IMPORTANCE "HIGH" | 10 |
| IMPORTANCE "MEDIUM" | 1 |
| IMPORTANCE "LOW" | -1 |

FIG. 13B

| COMPUTATION RESULT |||
|---|---|---|
| EVENT ID | CALCULATION FORMULA | PRIORITY |
| 0001 | (80*90+...+95*30+...)*10+0*1+0*(-1) | 120 |
| 0002 | (...)*10+(...)*1+15*15+...)*(-1) | 65 |
| ... | ... | ... |

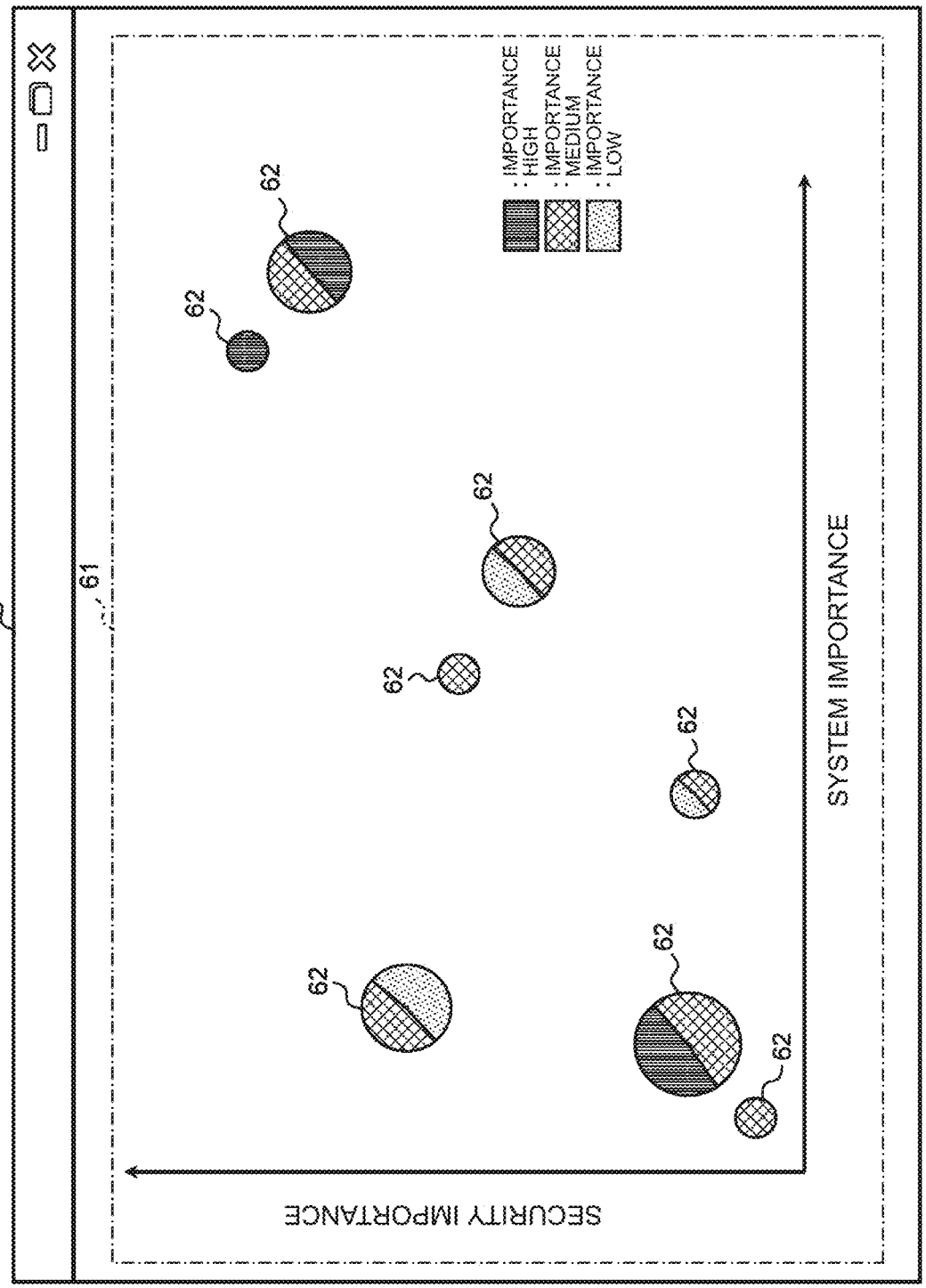

FIG.15

EVENT TYPE LIST 52

| EVENT TYPE ID | MESSAGE TEMPLATE | ... | SYSTEM IMPOR- TANCE | SECURITY IMPOR- TANCE |
|---|---|---|---|---|
| 1000 | APPLICATION SERVER (Tokyo-1) STOPPED ABNORMALLY | ... | 70 | 90 |
| 1001 | THERE IS NO MORE PRINTER PAPER. PRINTING HAS BEEN STOPPED. | ... | 65 | 20 |
| 1002 | USE OF DISK SPACE HAS EXCEEDED 80%. PLEASE CONSIDER ADDING A DISK. | ... | 65 | 30 |
| 1003 | REMAINING PRINTER PAPER IS LESS THAN 20%. | ... | 20 | 55 |
| ... | ... | ... | ... | ... |
| 52A | 52B | | 52C | 52D |

TASK SUPPORT SYSTEM AND METHOD

CROSS-REFERENCE TO RELATED APPLICATION

The present application claims priority from Japanese application JP2019-168723, filed on Sep. 17, 2019, the contents of which is hereby incorporated by reference into this application.

TECHNICAL FIELD

The present invention relates to a task support system and method which can be suitably applied, for example, to event handling task support of supporting the handling of event information generated by an application.

BACKGROUND ART

Conventionally, there was a system which displayed an event generated by an application on a screen, together with its importance, as described in PTL 1. When this kind of technology is applied to a system in which a plurality of application products coexist, because the standard of importance differs for each application, it was necessary to define the importance from the perspective of a system separate from the importance generated by the application. By providing an "event type list", the following system for realizing the foregoing configuration was considered. Note that "event type" refers to the categorized type after categorizing past events. Various methods may be considered as the method of categorization, and an example thereof will be explained later. Moreover, one or more event types indicated in a tabular format are hereinafter referred to as an "event type list".

In this system, when an event such as an error occurs, the application generates event information including a message describing the details of that event.

Moreover, a management device which manages the events of the application (this is hereinafter referred to as the "event management device") holds a list in which event master information of events that occur in the application to be managed is registered (this is hereinafter referred to as the "event type list"). Here, "event master information" refers to information including the event type ID, a message template indicating the template of the message to be included in the event information, and importance of the event type. In the ensuing explanation, an event registered in the event type list is referred to as a "known event".

When the event management device receives event information of an event that newly occurred, the event management device reads the message included in the received event information (this is hereinafter referred to as the "new event"), evaluates an event type of the same type as the new event among the known events registered in the event type list, and proposes the event master information to the operator. In the ensuing explanation, this evaluated event type is referred to as the "event type candidate". Moreover, in the ensuing explanation, the act of evaluating the event type candidate is referred to as "allocating the event type candidate". As the method of evaluation, there is, for example, a method of performing morphological analysis to the "message of the event" and the "message template of the event type" of a certain event, and deeming the event type having high similarity as the "event type candidate". Here, the index indicating the possibility that each event type candidate is the correct event type is hereinafter referred to as a "confidence score". As the confidence score, for instance, the foregoing similarity is used.

An operator can thereby handle a new event by referring to the event master information.

CITATION LIST

Patent Literature
 [PTL 1] Japanese Unexamined Patent Application Publication No. 2003-186704

SUMMARY OF THE INVENTION

Problems to be Solved by the Invention

In the foregoing device, it may not necessarily be possible to specify the event type candidates of one event to one event type, and a plurality of event types may exist as the event type candidates. In the foregoing case, such event type candidates are proposed to the operator, and the operator feedbacks the correct event type among the event type candidates. Based on the operator's foregoing operation, the event management device can allocate the new event with the event type list. Here, the importance of the associated event type is hereinafter referred to as the "true importance" of the corresponding event.

When there are a plurality of new events and it is therefore necessary to have the operator feedback the correct answers among the plurality of new events, the order that the operator feedbacks the correct answers is important, but it is difficult to determine that order. This is because, while the correct answers should be determined in order from the new event having the highest true importance, the true importance is still unknown.

While it is also possible to consider a system in which the event management device deems the importance of the event type of the first candidate among a plurality of event type candidates as "provisional importance" and displays a list in order of provisional importance, and the operator thereby feedbacks the correct answers in the displayed order, if the first candidate evaluated by the event management device is incorrect, there is a problem in that the feedback of the correct answers of the important event will be postponed. In other words, with this system, there is a problem in that information for evaluating the importance of each new event cannot be provided to the operator.

Furthermore, because the operator cannot evaluate the importance of each new event, there is a problem in that the order of handling the new events cannot be identified.

Moreover, there may be multiple criteria of importance. For example, while an event in which the operational continuity of the system is lost, such as an unplanned system halt caused by the operator's operation error, is an important event for the system administrator, the leakage of customer information due to an intrusion by a cracker is an important event for the security administrator. When there are multiple criteria of importance for one event as explained above, there is a problem in that such multiple criteria of importance cannot be identified with a conventional system.

The present invention was devised in view of the foregoing points, and an object of this invention is to propose a highly useful task support system and method capable of proposing the evaluated importance and confidence score of an unknown new event to the operator, and improving the safety of the operator's handling of the unknown new event.

Means to Solve the Problems

In order to achieve the foregoing object, the present invention provides a task support system which supports handling of an event that occurred in a management target, comprising: an event type evaluation unit which evaluates, in relation to an unknown event, one or more event types of the event as event type candidates; a first calculation unit which extracts a first event type candidate group having a high confidence score among the evaluated event type candidates, calculates a first candidate confidence score from each confidence score in each of the event type candidates of the extracted first event type candidate group, and calculates first candidate importance from first importance held by an event type corresponding to each event type candidate belonging to the first event type candidate group and information other than the first importance; and a representation unit which represents a diagram corresponding to each of the events in a coordinate space by using the first candidate confidence score and the first candidate importance.

Moreover, the present invention additionally provides a task support method executed by a task support system which supports handling of an event that occurred in a management target, comprising: a first step of evaluating, in relation to an unknown event, one or more event types of the event as event type candidates; a second step of extracting a first event type candidate group having a high confidence score among the evaluated event type candidates, calculating a first candidate confidence score from each confidence score in each event type candidate of the extracted first event type candidate group, and calculating first candidate importance from first importance held by an event type corresponding to each event type candidate belonging to the first event type candidate group and information other than the first importance; and a third step of representing a diagram corresponding to each of the events in a coordinate space by using the first candidate confidence score and the first candidate importance.

According to the task support system and method of the present invention, the operator can handle an unknown new event while identifying the confidence score and importance based on the analysis screen proposed from the event analyzing device. Thus, according to the task support system and method of the present invention, it is possible to improve the safety in the operator's handling of an unknown new event.

Advantageous Effects Of The Invention

According to the present invention, it is possible to realize a highly useful task support system and method.

BRIEF DESCRIPTION OF DRAWINGS

FIG. 3 is a diagram showing a configuration example of the event type list according to the first embodiment.

FIG. 4 is a diagram showing a configuration example of the event table.

FIG. 5 is a diagram showing a configuration example of the allocation result table.

FIGS. 10A and 10B are diagrams explaining the coordinate determination processing.

FIGS. 13A and 13B are diagrams explaining the recommendation arrow drawing processing.

FIG. 14 is a diagram showing a screen configuration example of the new event analysis screen according to the second embodiment.

FIG. 15 is a diagram showing a configuration example of the event type list according to the second embodiment.

DESCRIPTION OF EMBODIMENTS

An embodiment of the present invention is now explained in detail with reference to the appended drawings.

Figure 1:
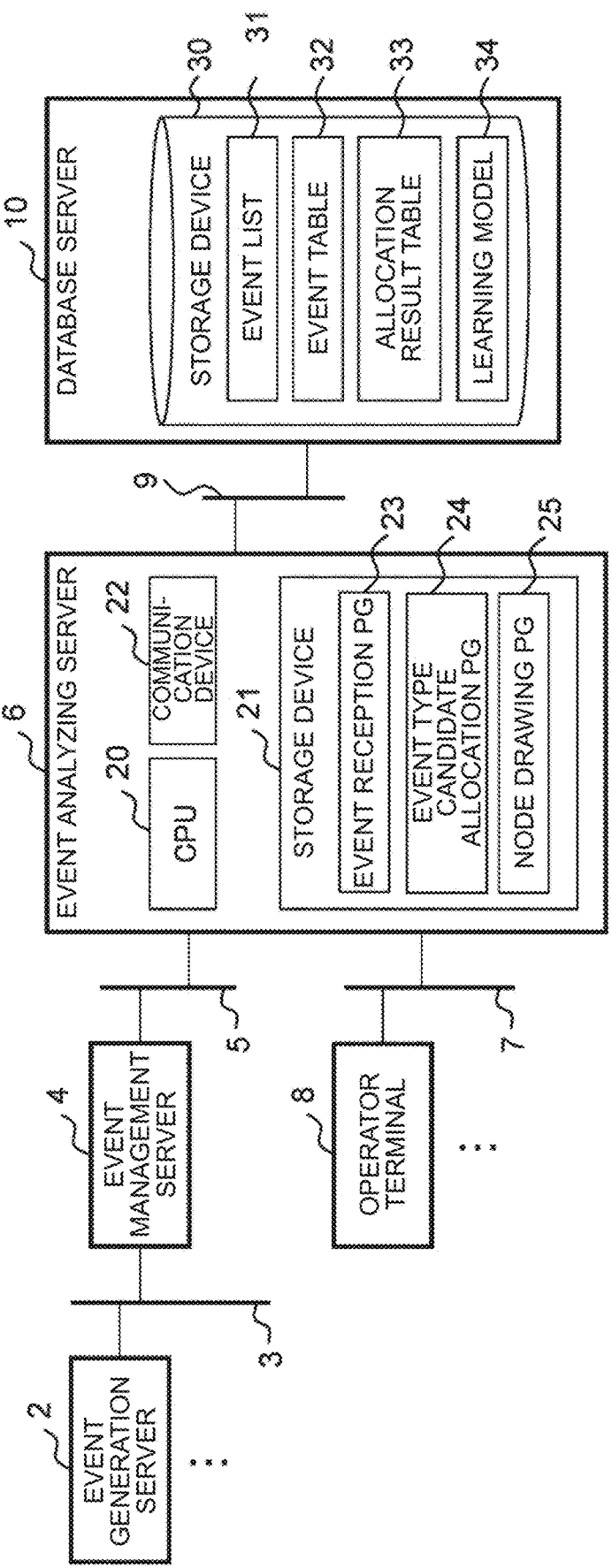
FIG. 1 is a block diagram showing the overall configuration of the event handling task support system according to the first and second embodiments.

(1) First Embodiment (1-1) Configuration of Event Handling Task Support System According to this Embodiment In FIG. 1, reference numeral 1 represents the overall event handling task support system according to this embodiment. The event handling task support system 1 is configured by comprising one or more event generation servers 2 provided respectively in correspondence with the applications and apparatuses of the management target, an event management server 4 connected to each event generation server 2 via a first network 3, one or more event analyzing servers 6 connected to the event management server 4 via a second network 5, one or more operator terminals 8 connected to each event analyzing server 6 via a third network 7, and a database server 10 connected to the event analyzing server 6 via a fourth network 9.

The event generation server 2 is a server device having a function of generating event information, when some kind of event occurs in the corresponding application, according to such event, and sending the generated event information to the event management server 4 via the first network 3.

Moreover, the event management server 4 sends the event information sent from each event generation server 2 to the event analyzing server 6 via the second network 5.

The event analyzing server 6 is a server device equipped with the event handling task support function explained later, and is configured by comprising information processing resources such as a CPU (Central Processing Unit) 20, a storage device 21 and a communication device 22.

The CPU 20 is a processor which governs the operational control of the overall event analyzing server 6. Moreover, the storage device 21 is configured, for example, from a semiconductor memory and a hard disk device, and is used for storing and retaining necessary programs and data. The event reception program 23, the event type candidate allocation program 24 and the node drawing program 25 explained later are also stored and retained in the storage device 21.

The communication device 22 is configured, for example, from an NIC (Network Interface Card), and performs protocol control during communication with the event management server 4, the operator terminal 8 or the database server 10 via the second to fourth networks 5, 7, 9.

The operator terminal 8 is a computer device that is used by the system administrator, the security administrator or the operator (worker) to actually handle a new event that occurred, and displays the new event analysis screen 40 explained later with reference to FIG. 2 based on the screen data sent from the event analyzing server 6 as explained later.

The database server 10 is a server device which stores and retains various types of information required for the event analyzing server 6 to generate the new event analysis screen 40, and is configured by comprising a large-capacity nonvolatile storage device 30 such as a hard disk device, an SSD (Solid State Drive) or a flash memory. The storage device 30 of the database server 10 stores and retains the event type list 31, the event table 32, the allocation result table 33 and the learning model 34 explained later.

(1-2) Event handling task support function according to this embodiment The event handling task support function equipped in the event analyzing server 6 of the event handling task support system 1 is now explained. The event handling task support function is a function which analyzes each event information sent from the event management server 4, generates the new event analysis screen 40 shown in FIG. 2 based on the analysis, and displays the generated new event analysis screen 40 on the operator terminal 8.

Each time the event analyzing server 6 receives event information, the event analyzing server 6 sequentially compares the message indicating the details of the new event that occurred based on the text information included in the event information with the message template based on the text information included in the event master information of each known event registered in the event type list 31 of the database server 10, and calculates, for each known event, the similarity level of the contents of the message template based on the text information included in the event master information in comparison to the details of the message based on the text information included in the event information of the new event (this is hereinafter referred to as the "confidence score").

Subsequently, the event analyzing server 6 extracts, from the event type list 31, all known events in which the confidence score is equal to or greater than a predetermined threshold (this is hereinafter referred to as the "confidence score threshold") based on the confidence score for each calculated known event, and allocates the extracted known events to the new event as the event type candidates.

If all of the known events were less than the confidence score threshold, a message to such effect is displayed on the operator terminal 8. The operator feedback one of the known events, or inputs a message to the effect of being a new event as well as the importance thereof. When a message to the effect of being a new event is input, the event analyzing server 6 adds one line of the following contents to the event type list 31 explained later with reference to FIG. 3 in correspondence with the relevant event. The contents of the line to be added shall be as follows; namely, the event type ID (31A) shall be a number that is newly numbered, the message template 31B shall be a copy of the message of the line of the new event of the event table 32, and the corresponding line of the importance 31C of the event type list 31 shall be the importance input by the operator.

Figure 2:
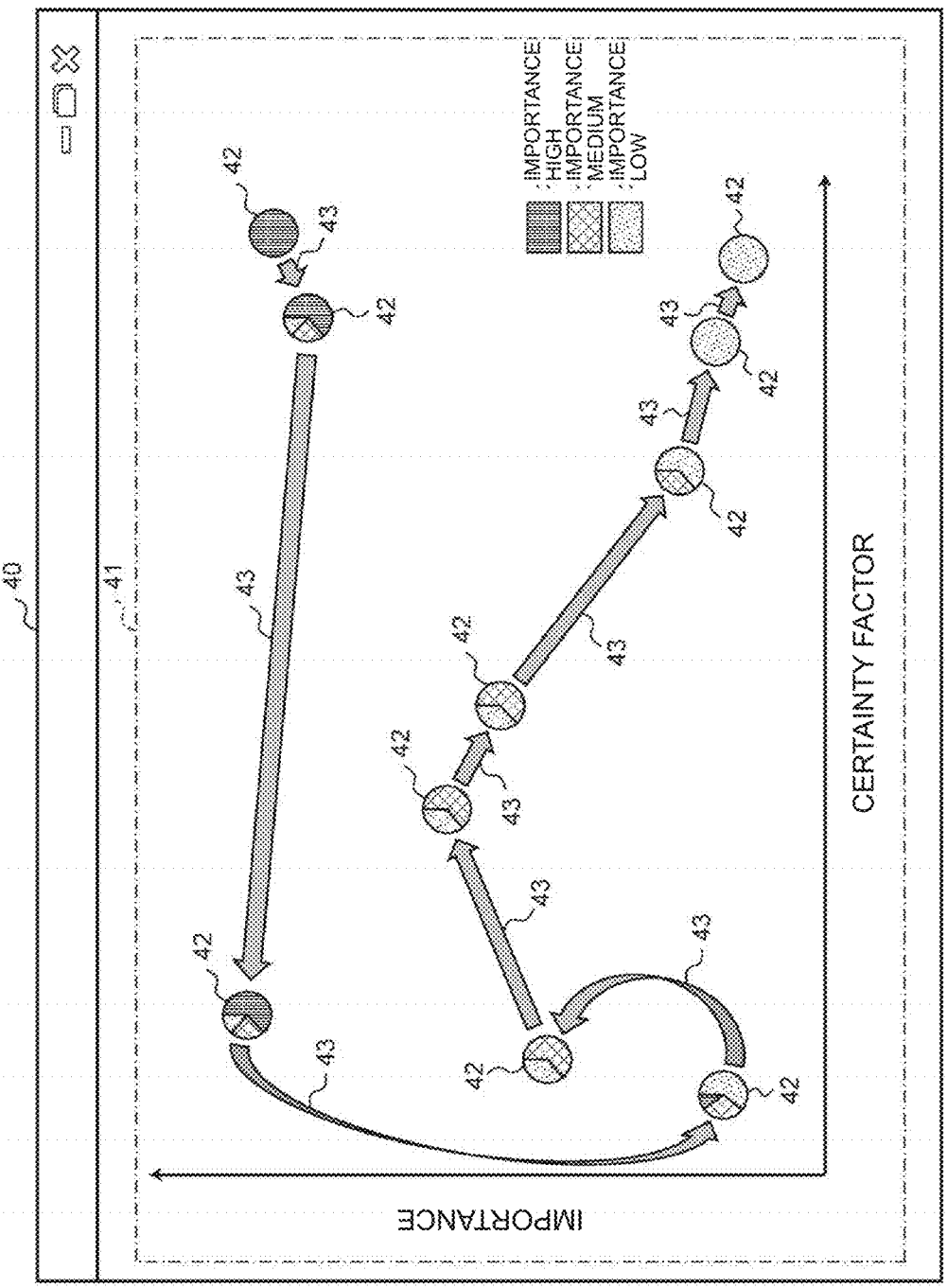
FIG. 2 is a diagram showing a screen configuration example of the new event analysis screen according to the first embodiment.

Moreover, the event analyzing server 6 generates the new event analysis screen 40 as shown in FIG. 2 based on the allocation result of the event type candidate to the new event. The event analyzing server 6 displays the new event analysis screen 40 on the operator terminal 8 by sending the screen data of the generated new event analysis screen 40 to the relevant operator terminal 8 via the third network 7.

Here, the new event analysis screen 40 is configured by comprising, as shown in FIG. 2, plane coordinates 41 in which the vertical axis takes on the importance and the horizontal axis takes on the confidence score. Displayed on the plane coordinates 41 are each new event among the new events corresponding respectively to each event information previously received by the event analyzing server 6 which has not yet been handled by the operator, and the nodes 42 corresponding respectively thereto.

These node 42 are configured from a circle graph of a predetermined size wherein, as the central coordinate, used is the xy coordinate in which the confidence score of the event type candidate having the largest confidence score among the event type candidates allocated to the respectively corresponding new events is indicated as the x coordinate, and the importance pre-set by the user to the event type candidate as explained later is indicated as the y coordinate. Otherwise, the maximum confidence score of one or more event type candidates in which the confidence score is equal to or greater than the threshold may be indicated as the x coordinate, and the maximum importance may be indicated as the y coordinate.

Furthermore, with this circle graph, an existence ratio of the event type candidates in which the importance is set to a high value (for example, "80" or higher), the event type candidates in which the importance is set to a medium value (for example, "30" to "79"), and the event type candidates in which the importance is set to a low value (for example, "29" or less) among the event type candidates allocated to the corresponding to new event is represented in a size of the central angle of the area in which such importance is associated respectively to "high", "medium" and "low".

Moreover, displayed on the plane coordinates 41 is an arrow (this is hereinafter referred to as the "recommendation arrow") 43 representing the recommended order that the operator should handle the new events corresponding respectively to the nodes 42 existing on the plane coordinates 41.

The recommendation arrow 43 is displayed between the relevant nodes 42 so as to indicate the order of the respective nodes from the node 41 of a new event having a high priority to the node 41 of a new event having a low priority based on the priority of the new events determined based on the importance set to each event type candidate allocated to the new event corresponding to that node 42 and the confidence score calculated for each of such event type candidates.

The operator is thereby able to handle the new events in order from the new event having a higher priority by handling the new events corresponding respectively to the nodes 42 in the order indicated by the recommendation arrow 42 displayed on the new event analysis screen 40.

As the means for the realizing the foregoing event handling task support function according to this embodiment, as shown in FIG. 1, the storage device 21 (FIG. 1) of the event analyzing server stores an event reception program 23, an event type candidate allocation program 24 and a node drawing program 25, and the storage device 30 of the database server 10 stores an event type list 31, an event table 32, an allocation result table 33 and a learning model 34.

The event reception program 23 is a program having a function of receiving the event information of each new event sent from the event management server 4, and sequentially registering the received event information in the event table 32 of the database server 10.

Moreover, the event type candidate allocation program 24 is a program having a function of extracting a known event having a similar message among the known events registered in the event type list 31 and allocating such extracted known event, as an event type candidate, to each new event registered in the event table 32, and registering the allocation result in the allocation result table 33. In this embodiment, while the confidence score is calculated by performing morphological analysis to the messages and calculating the similarity thereof, the confidence score may also be calculated by using machine learning. In the foregoing case, the event type candidate allocation program 24 is equipped with a function of performing machine learning to the event type candidate to be allocated to the new event by using the learning model 34 stored in the database server 10.

The node drawing program 25 is a program with a function of generating screen data of the new event analysis screen 40 based on the importance and other factors of each event type candidate allocated to each new event by the event type candidate allocation program 24, and sending the screen data of the generated new event analysis screen 40 to the operator terminal 8 via the third network 7. As explained above, the new event analysis screen 40 is displayed on the operator terminal 8 based on the foregoing screen data.

Meanwhile, the event type list 31 is a list for managing and holding the event master information of previously registered known events and has a table configuration comprising, as shown in FIG. 3, at least an event type ID column 31A, a message template column 31B and an importance column 31C. In the event type list 31, one line corresponds to one known event.

The event type ID column 31A stores an event type ID which is unique in the event type list 31 and assigned to the corresponding known event. Moreover, the message template column 31 B stores, as a message template, text information of a message included in the event information sent from the event management server 4 (FIG. 1) when a corresponding known event has occurred, and the importance column 31C stores the importance of the corresponding known event pre-set by the operator to such known event.

Accordingly, in the example of FIG. 3, for example, with regard to the known event to which an event type ID of "1000" has been assigned, text information of a message to the effect of "application server (*) stopped abnormally" is included in the event information received by the event analyzing server 6** when such known event has occurred, and the importance of such known event has been set to "90" by the operator.

The event table 32 is a table that is used for managing the event information of the new event and is configured by comprising, as shown in FIG. 4, at least an event ID column 32A and a message column 32B. In the event table 32, one line corresponds to one new event which has not yet been handled by the operator.

The event ID column 32A stores a numbered event ID which is unique in the event table 32 each time a new event arrives, and the message column 32B stores text information of a message representing the details of the new event which was included in the event information.

Accordingly, in the example of FIG. 4, the message representing the details of the new event based on the text information included in the event information of the new event to which an event ID of "0001" has been assigned is "application server (Nagoya) stopped abnormally".

The allocation result table 33 is a table that is used for managing the event type candidates allocated to each new event and the confidence score thereof, and is configured by comprising, as shown in FIG. 5, an event ID column 33A, an event type ID column 33B and a confidence score column 33C. In the allocation result table 33, one line corresponds to one event type candidate allocated to one new event registered in the event table 32 (FIG. 4).

The event ID column 33A stores the event ID of a new event that is registered in the event table 32 and which has not yet been handled, and the event type ID column 33B stores one event type ID of the event type candidate (known event) allocated to that new event. Moreover, the confidence score column 33C stores a confidence score, which is a calculated value regarding the possibility that the new event corresponding to the event ID column 33A can be allocated to the event type corresponding to the event type ID column 33B.

Accordingly, in the example of FIG. 5, for example, at least three known events including a first known event to which an event type ID of "1000" has been assigned, a second known event to which an event type ID of "1001" has been assigned, and a third known event to which an event type ID of "1003" has been assigned are allocated, as the event type candidates, to the new event to which an event ID of "0001" has been assigned, and the confidence scores of the first to third known events are respectively "90", "40" and "30".

Note that, in the case of the event handling task support system 1, the entries of each new event in the event table 32 and the allocation result table 33 are deleted from the event table 32 and the allocation result table 33 once the handling of the new event by the operator is completed.

When the operator completes handling the new event for which a node 42 has been displayed on the new event analysis screen 40, the operator performs an operation to input a message to such effect by using the operator terminal 8. When the foregoing input operation is performed, the operator terminal 8 sends, to the event analyzing server 6, a command identifying the new event for which the handling thereof has been completed.

The node drawing program 24 of the event analyzing server 6 that received the foregoing command erases the entries of the new event identified in such command from the event table 32 and the allocation result table 33. Consequently, the node 42 corresponding to that new event is no longer displayed on the new event analysis screen 40.

(1-3) Various Types of Processing Related to Event Handling Task Support Function According to this Embodiment The specific processing contents of the various types of processing to be executed by the event analyzing server 6 in relation to the foregoing event handling task support function are now explained. Note that, in the ensuing explanation, while the processing subject of the various types of processing is explained as a "program", it goes without saying that, in effect, the CPU 20 (FIG. 1) executes the processing based on such "program".

(1-3-1) Flow of Event Handling Task Support Processing

Figure 6:
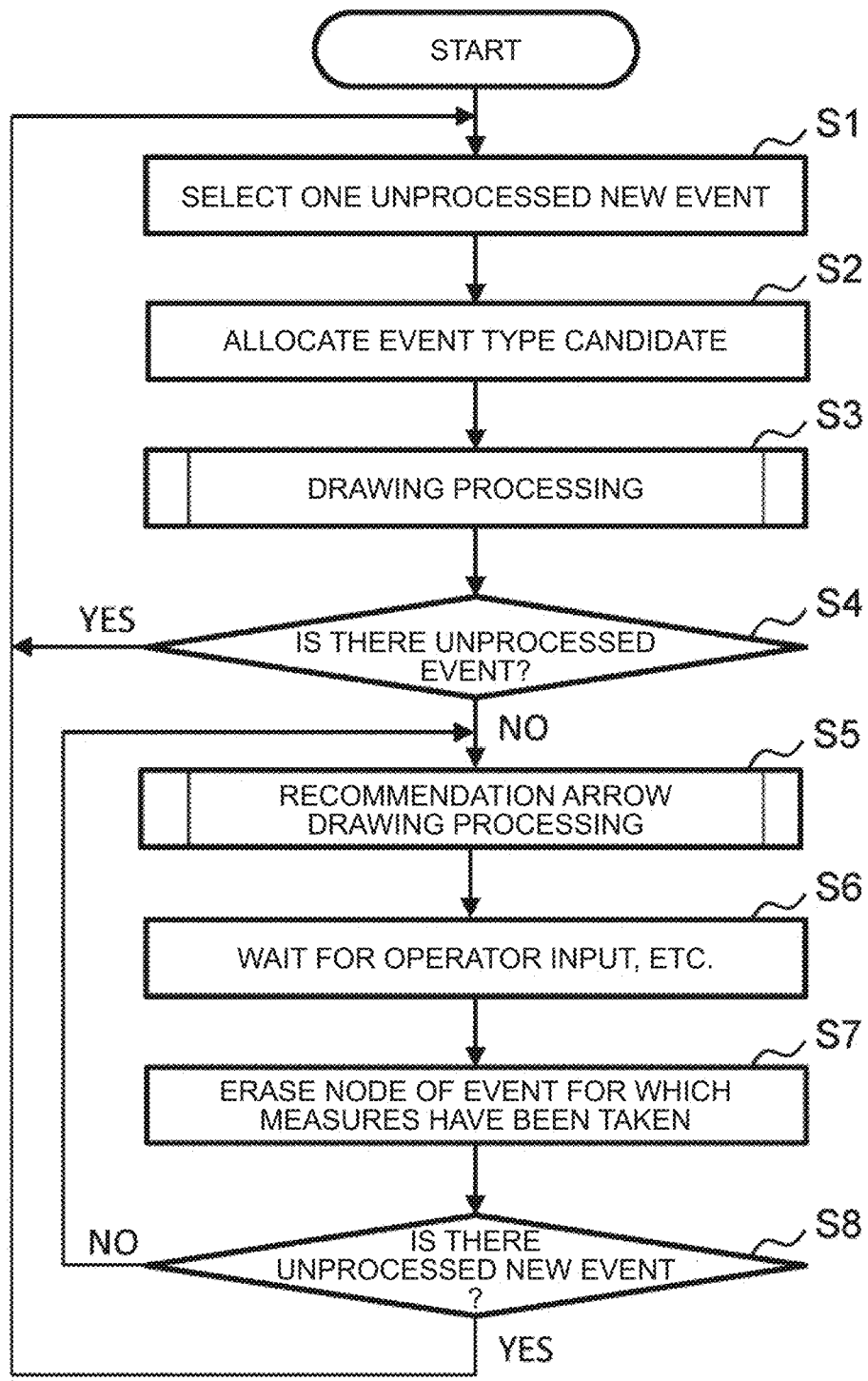
FIG. 6 is a flowchart showing the processing routine of the event handling task support processing.

FIG. 6 shows the flow of the series of processing (in the present invention, this is hereinafter referred to as the "event handling task support processing") to be executed by the event analyzing server 6 in relation to the foregoing event handling task support function. The event handling task support processing is started when the operator, after the event analyzing server 6 is activated, operates the operator terminal 8 and instructs the event analyzing server 6 to execute the event handling task support processing.

When the event handling task support processing is started, the event type candidate allocation program 24 (FIG. 1) foremost selects one new event among the new events registered in the event table 32 (FIG. 4) (S1).

Next, the event type candidate allocation program 24 allocates, as the event type candidate(s), zero or more known events from the event type list 31 to the new event selected in step S1 (this is hereinafter referred to as the "selected new event") (S2).

Specifically, the event type candidate allocation program 24, based on the text information of the message representing the details of the selected new event included in the event information of the selected new event, breaks down such message for each part of speech based on morphological analysis, and vectorizes the characteristic amount of such message by using methods such as N-gram processing or TF-IDF processing based on such parts of speech that were broken down.

Moreover, the event type candidate allocation program 24, based on the text information of the message representing the details of the known event included in the event master information of the respective known events registered in the event type list 31 (FIG. 3), vectorizes the respective characteristic amounts of such message according to the same method.

Subsequently, the event type candidate allocation program 24 compares, for each known event, the vector of the characteristic amount of the message of the new event and the vector of the characteristic amount of the message of the corresponding known event, and calculates the distance of the two vectors as the confidence score of that known event.

Subsequently, the event type candidate allocation program 24 extracts all known events in which the confidence score is equal to or greater than the foregoing confidence score threshold based on the confidence score of each known event calculated pursuant to the foregoing processing, and allocates such extracted known events as the event type candidates to the selected new event. Moreover, the event type candidate allocation program 24 registers the allocation result in the allocation result table 33.

Subsequently, the event type candidate allocation program 24 calls the node drawing program 25, and delivers the event ID of the selected new event, as a parameter, to the node drawing program 25 (FIG. 1).

When the node drawing program 25 is called by the event type candidate allocation program 24, the node drawing program 25 searches for the event type ID and the confidence score from the allocation result table 32 with the event ID of the selected new event delivered from the event type candidate allocation program 24 as the search key, searches for the importance registered in the event type list 31 with the event type ID detected in the foregoing search as the search key, and executes the drawing processing of drawing the foregoing nodes 42 corresponding to the selected new events, as shown in FIG. 2, on the plane coordinates 41 of the new event analysis screen 40 based on the foregoing information (S3). Details of this drawing processing will be explained later. The node drawing program 25 thereafter returns the processing to the event type candidate allocation program 24.

The event type candidate allocation program 24 to which the processing was returned determines whether there is any new event to which an event type candidate has not yet been allocated among the new events registered in the event table 32 (S4).

If there is an unprocessed event in step S4, the event type candidate allocation program 24 returns to step 51. Moreover, if an event type candidate has been allocated to all new events registered in the event table 32 in step S4, the event type candidate allocation program 24 calls the recommendation arrow drawing processing (S5).

Upon returning from the recommendation arrow drawing processing, the event type candidate allocation program 24 enters a standby state of waiting for an input from the operator (S6). Specifically, the event type candidate allocation program 24 waits until an input is made by the operator or another new event arrives. When an input is made by the operator or another new event arrives, the event type candidate allocation program 24 advances the processing to step S7.

Moreover, the event type candidate allocation program 24 thereafter deletes, from the plane coordinates 41, the node 42 corresponding to the new event that has been handled by the operator among the respective nodes 42 that were drawn on the plane coordinates 41 of the new event analysis screen 40 in step S3 (S7).

Subsequently, the event type candidate allocation program 24 determines whether another new event, to which an event type candidate has not been allocated, has been registered in the event table 32 (S8). When the event type candidate allocation program 24 obtains a NO in the foregoing determination, the event type candidate allocation program 24 returns to step S5, and thereafter repeats the processing of step S5 to step S8 until a YES is obtained in step S8.

Meanwhile, when the event type candidate allocation program 24 obtains a YES in step S8 as a result of another new event, to which an event type candidate has not been allocated, being registered in the event table 32, the event type candidate allocation program 24 returns to step 51, and thereafter executes the processing of step S2 onward in the same manner as explained above.

(1-3-2) Drawing Processing
(1-3-2-1) Flow of Drawing Processing

Figure 7:
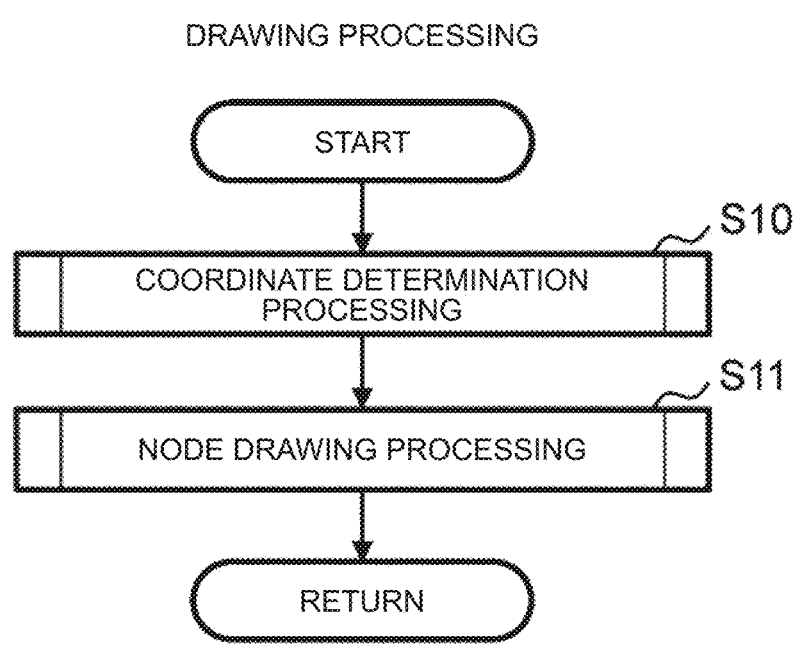
FIG. 7 is a flowchart showing the processing routine of the drawing processing.

FIG. 7 shows the specific processing contents of the drawing processing to be executed by the node drawing program 25 (FIG. 1) in step S3 of the maintenance handling task support processing explained above with reference to FIG. 6.

When the node drawing program 25 is called by the event type candidate allocation program 24, the node drawing program 25 starts the drawing processing shown in FIG. 7, and foremost executes the coordinate determination processing for determining the coordinate (central coordinate of the relevant node 42 in this example) on which should be drawn the node 42 (FIG. 2) corresponding to the selected new event on the plane coordinates 41 of the new event analysis screen 40 (S10).

Subsequently, the node drawing program 25 executes the node drawing processing of drawing the node 42 corresponding to the selected new event centered around the coordinate determined in step S10 (S11). Based on this node drawing processing, the node 42 corresponding to the selected new event is drawn on the plane coordinates 41 of the new event analysis screen 40 displayed on the operator terminal 8.

The node drawing program 25 thereafter ends the drawing processing, and returns to step S4 of the event handling task support processing.

(1-3-2-2) Flow of Coordinate Determination Processing

Figure 8:
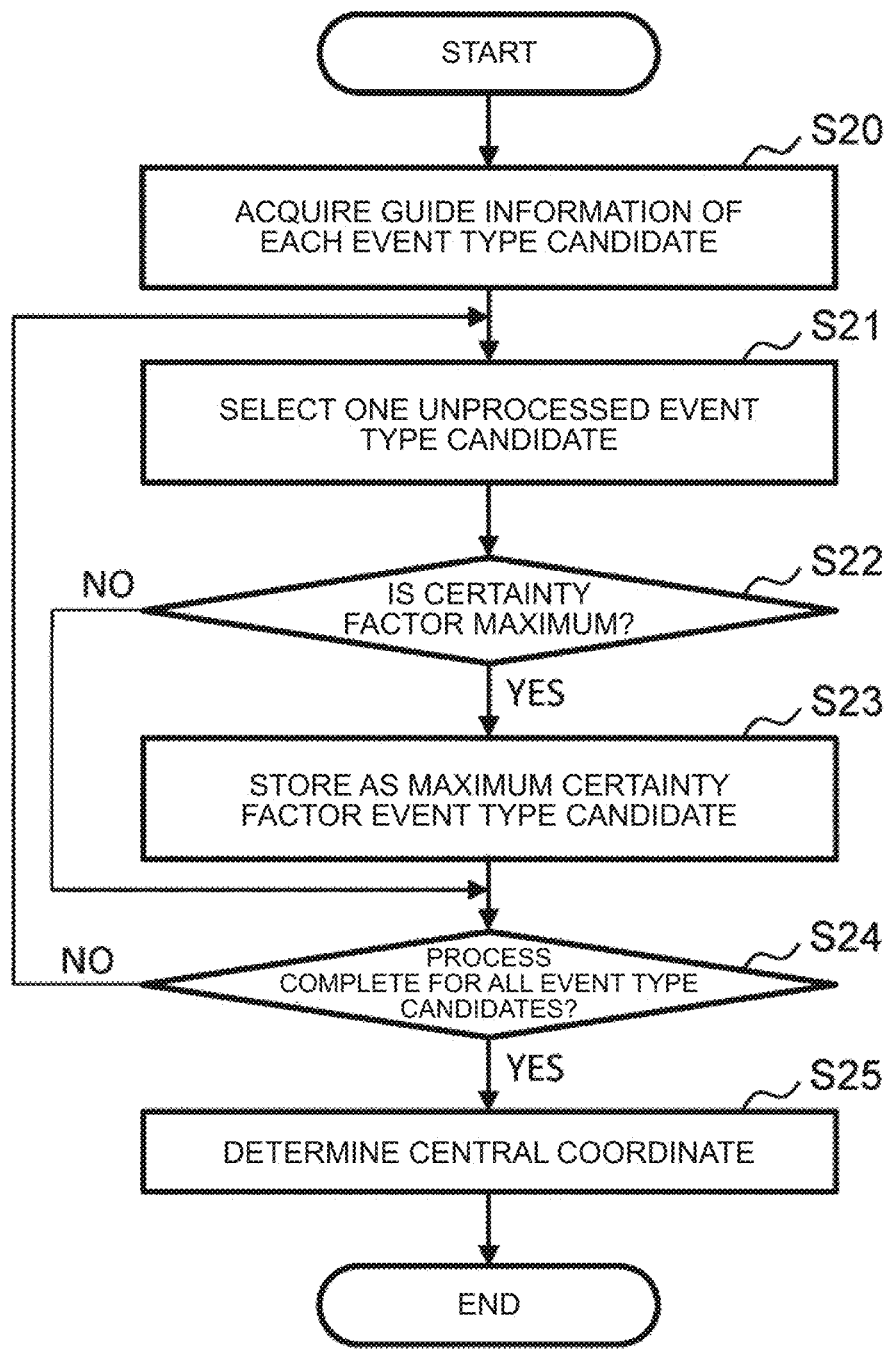
FIG. 8 is a flowchart showing the processing routine of the coordinate determination processing.

FIG. 8 shows the specific processing contents of the coordinate determination processing to be executed by the node drawing program 25 in step S10 of the drawing processing explained above with reference to FIG. 7.

When the node drawing program 25 proceeds to step S10 of the drawing processing, the node drawing program 25 starts the coordinate determination processing shown in FIG. 8, and foremost reads, from the event type list 31 stored in the database server 10 (FIG. 1), the event master information of each event type candidate allocated to the selected new event by the event type candidate allocation program 24 (S20). Here, the maximum confidence score event type candidate to be used in step S23 is initialized to "no candidate".

Subsequently, the node drawing program 25 selects one event type candidate which has not yet undergone the processing of step S22 onward among the respective event type candidates in which the event master information was read in step S20 (S21). Next, the node drawing program 25 determines whether the confidence score of the event type candidate selected in step S21 is maximum among the event type candidates selected in step S21 up until now. Specifically, the node drawing program 25 determines that the confidence score is maximum when "the maximum confidence score event type candidate indicated in step S23 is in an initialized state" or "the confidence score of the event type candidate selected in step S21 is greater than the confidence score of the maximum confidence score event type candidate indicated in step S23" (S22). When the node drawing program 25 obtains a NO in the foregoing determination, the node drawing program 25 proceeds to step S24.

Meanwhile, when the node drawing program 25 obtains a YES in the determination of step S22, the node drawing program 25 stores the event type ID and the confidence score of the event type candidate selected in step S21 as the event type ID and the confidence score of the event type candidate in which the confidence score is maximum (in the present invention, this is hereinafter referred to as the "maximum confidence score event type candidate") (S23).

Next, the node drawing program 25 determines whether the processing of step S21 to step S23 has been executed for all event type candidates allocated to the selected new event (S24). When the node drawing program 25 obtains a NO in the foregoing determination, the node drawing program 25 returns to step S21, and thereafter repeats the processing of step S21 to step S24 while sequentially switching the event type candidate to be selected in step S21 to another event type candidate which has not yet undergone the processing of step S22 onward among the event type candidates allocated to the selected new event.

Subsequently, when the node drawing program 25 obtains a YES in step S24 as a result of the processing of step S22 to step S23 being executed for all event type candidates allocated to the selected new event, the node drawing program 25 determines the central coordinate of the node 42 corresponding to the selected new event to be drawn on the plane coordinates 41 of the new event analysis screen 40 as the coordinate position in which the value stored as the confidence score of the maximum confidence score event type candidate is indicated as the x coordinate, and the importance stored in the corresponding line of the event type list 31 regarding the maximum confidence score event type candidate is indicated as the y coordinate (S25). The node drawing program 25 thereafter ends the coordinate determination processing, and returns to step 510 of the drawing processing explained above with reference to FIG. 7.

(1-3-2-3) Flow of Node Drawing Processing

Figure 9:
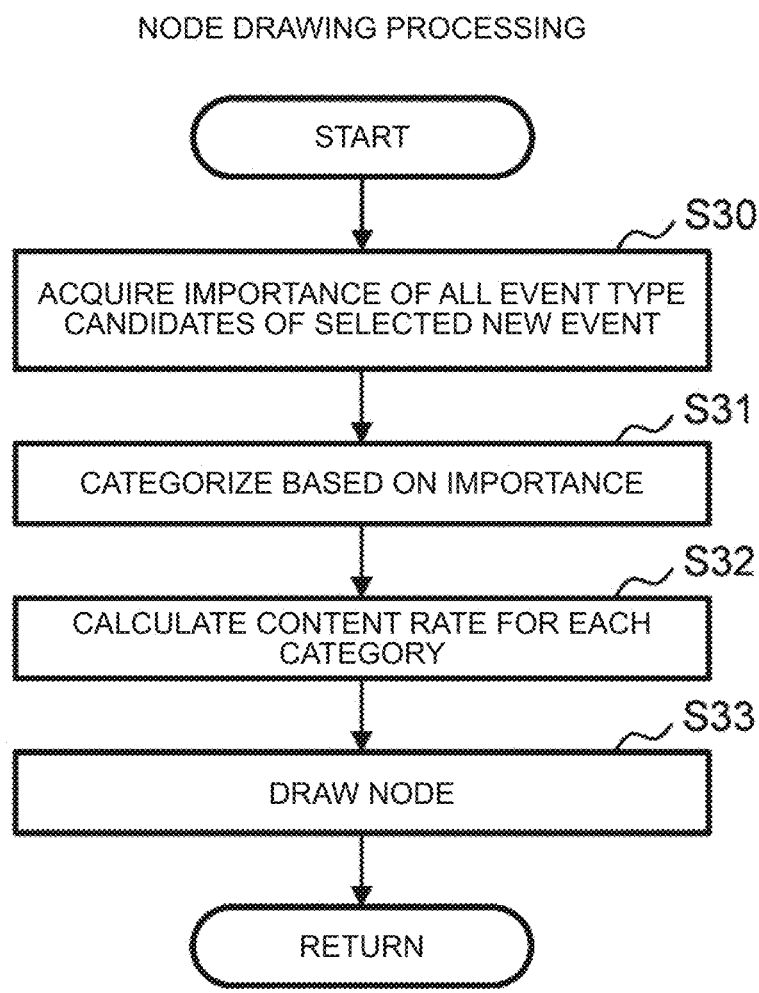
FIG. 9 is a flowchart showing the processing routine of the node drawing processing according to the first embodiment.

FIG. 9 shows the specific processing contents of the node drawing processing to be executed by the node drawing program 25 in step S11 of the drawing processing explained above with reference to FIG. 7.

When the node drawing program 25 advances to step S11 of the drawing processing, the node drawing program 25 starts the node drawing processing shown in FIG. 9, and foremost acquires, from the event type list 31 (FIG. 1) of the database server 10 (FIG. 1), the importance of each event type candidate allocated to the selected new event (S30).

Subsequently, the node drawing program 25 classifies the importance of each event type candidate of the selected new event into the three categories of "high", "medium" and "low" based on the acquired importance (S31).

Specifically, the node drawing program 25 classifies, as shown in FIG. 10A, an event type candidate in which the importance set by the user is equal to or greater than a predetermined first threshold (for example, "80") as a category of "high" importance, an event type candidate in which the importance set by the user is less than the first threshold and equal to or greater than a predetermined second threshold (for example, "30") as a category of "medium" importance, and an event type candidate in which the importance set by the user is less than the second threshold as a category of "low" importance.

Subsequently, the node drawing program 25 calculates the content rate of the event type candidates for each category as shown in FIG. 10B (S32). Specifically, the node drawing program 25 calculates, for each category, the content rate of the event type candidates in such category as shown in the following formula:

[Math 1]

$$\text{Content rate} = (\Sigma \text{ confidence score in category}/\Sigma \text{ certain factor}) \times 100 \qquad (1)$$

so that the ratio of the sum of the confidence scores of all event type candidates belonging to that category relative to the sum of the confidence scores of all event type candidates allocated to the selected new event is centupled.

Subsequently, the node drawing program 25 draws a node 42 (FIG. 2) represented with a circle graph of a given radius on the plane coordinates 41 (FIG. 2) of the new event analysis screen 40 (FIG. 2 and FIG. 19) with the coordinate determined based on the coordinate determination processing explained above with reference to FIG. 8 as the central coordinate (S33).

Figure 11:
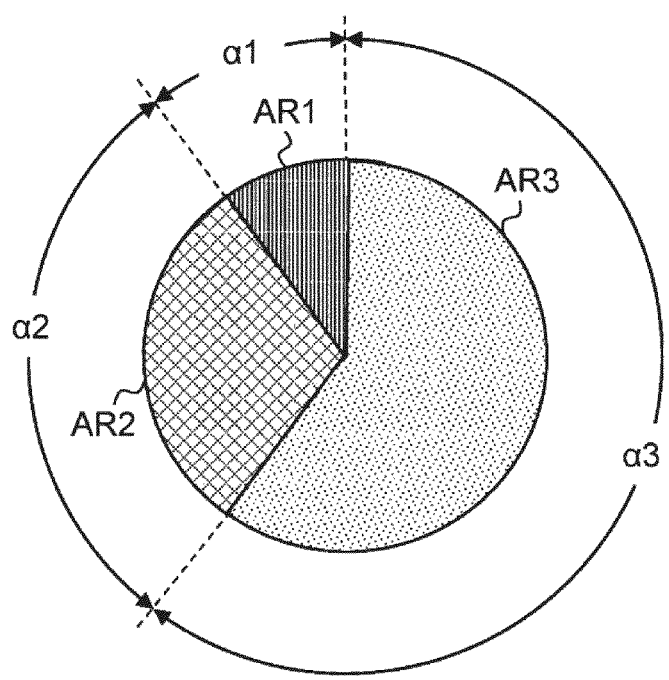
FIG. 11 is a diagram explaining the coordinate determination processing.

Here, the node drawing program 25, as shown in FIG. 11, multiplies the central angles α1, α2, α3 (each 360 degrees) of the respective areas AR1, AR2, AR3 in the nodes 42 corresponding respectively to the three categories of "high", "medium" and "low" importance by the content rate of the event type candidates in the corresponding category, divides the inside of the nodes 42 to become a value obtained by dividing the multiplication result by 100, and colors the areas AR1 to AR3 with a color corresponding to such category or draws a pattern corresponding to such category in the areas AR1 to AR3.

The node drawing program 25 thereafter ends the node drawing processing and returns to the drawing processing explained above with reference to FIG. 7.

(1-3-2-4) Flow of Recommendation Arrow Drawing Processing

Figure 12:
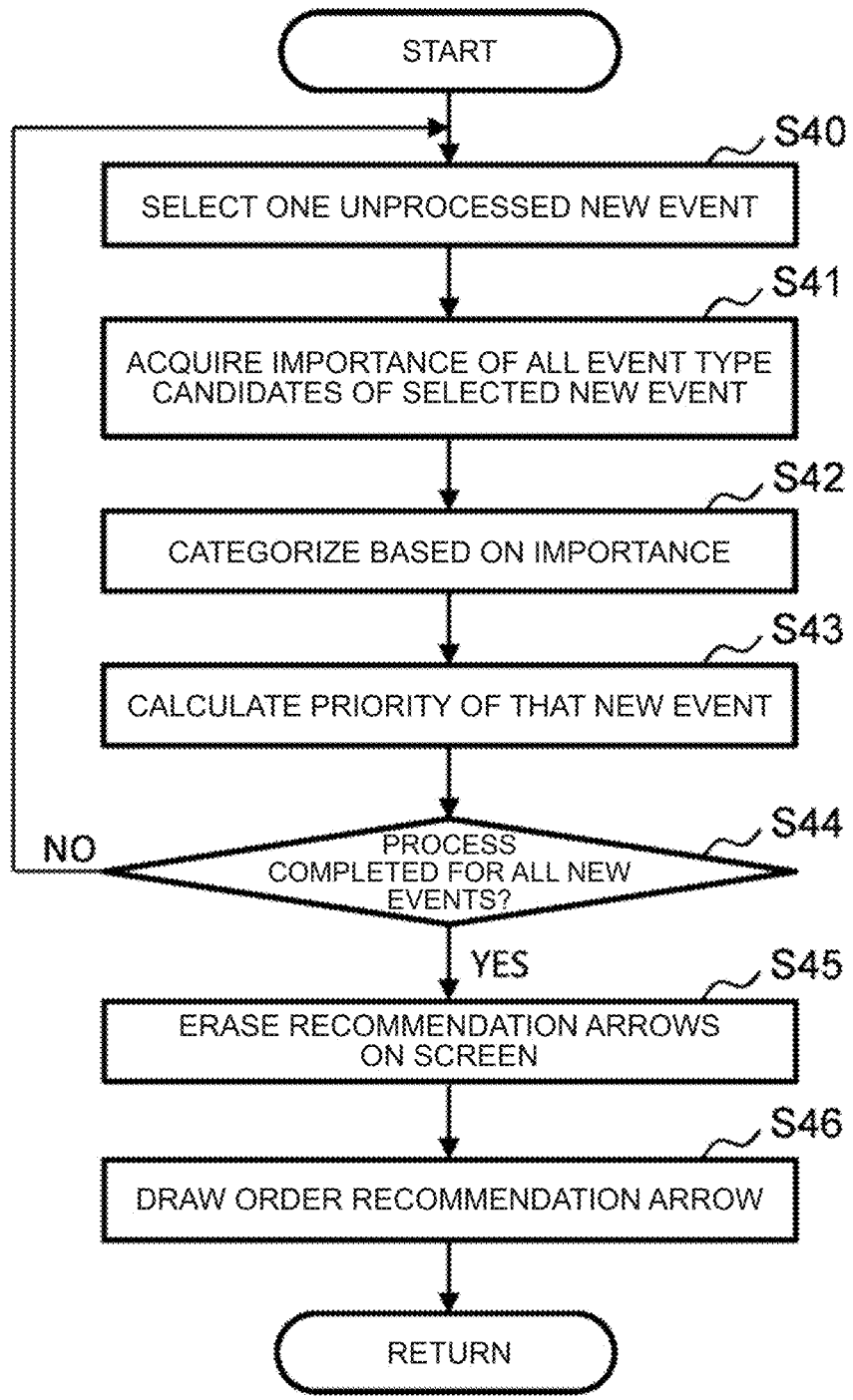
FIG. 12 is a flowchart showing the processing routine of the recommendation arrow drawing processing.

FIG. 12 shows the specific processing contents of the recommendation arrow drawing processing to be executed by the node drawing program 25 in step S5 of the event handling task support processing explained above with reference to FIG. 6.

When the node drawing program 25 advances to step S5 of the event handling task support processing, the node drawing program 25 starts the recommendation arrow drawing processing shown in FIG. 12, and foremost erases the recommendation arrow 43 displayed on the plane coordinates 41 (FIG. 2) of the new event analysis screen 40 (FIG. 2). Subsequently, the node drawing program 25 performs step S40 to step S43 relation to each new event existing in the event table 32.

Specifically, the node drawing program 25 selects one new event which has not yet undergone the processing of step S41 onward among all new events existing in the event table 32 (S40).

Subsequently, the node drawing program 25 acquires the importance of all event type candidates allocated to the new event selected in step S40 by reading such importance from the event type list 31 (FIG. 3) of the database server 10 (FIG. 1) (S41).

Next, the node drawing program 25 classifies each event type candidate in which the importance was acquired in step S41 into the three categories of "high", "medium" and "low" importance in the same manner as step S31 of FIG. 9 (S42). Moreover, the node drawing program 25 thereafter calculates the priority of handling the new event selected in step S40 according to the following formula (S43).

[Math 2]

$$\text{Priority} = \Sigma \, (\Sigma \, \text{importance} \times \text{confidence score}) \times \text{category coefficient} \quad (2)$$

Specifically, the node drawing program 25 respectively multiplies the importance and confidence score of the corresponding event type candidate among the respective event type candidates of the new event selected in step S40 for each event type candidate classified into the category of "high" importance.

Moreover, the node drawing program 25 multiplies the value, which is obtained by totaling the foregoing multiplication results, by the category coefficient (as defined below) set to the corresponding category (category of "high" importance) among the coefficients pre-set to each category as shown in FIG. 13A (this is hereinafter referred to as the "category coefficient").

Furthermore, the node drawing program 25 performs similar computation for each category of each event type candidate among the respective event type candidates of such new event which is classified into the categories of "medium" importance or "low" importance, and, as shown in FIG. 13B, calculates the value obtained by totaling all computational results of the three categories as the priority of that new event.

Subsequently, the node drawing program 25 determines whether the processing of step S41 to step S43 has been executed for all new events existing in the event table 32 (S44). When the node drawing program 25 obtains a NO in the foregoing determination, the node drawing program 25 returns to step S40, and thereafter repeats the processing of step S40 to step S44 while sequentially switching the new event to be selected in step S40 to another new event which has not yet undergone the processing of step S41 onward.

Meanwhile, when the node drawing program 25 obtains a YES in step S44 as a result of completing the calculation of priority of all new events existing in the event table 32, the node drawing program 25 foremost erases all recommendation arrows on the screen (S45), and draws the foregoing recommendation arrow 43 between the respective corresponding nodes 42 on the plane coordinates 41 of the new event analysis screen 40 based on the priority of each new event calculated in the manner explained above (S46).

Specifically, the node drawing program 25 sorts the respective new events existing in the event table 32 in order from the new event having the highest priority, and draws the recommendation arrow 43 between the relevant nodes 42 so that the new events can be indicated in the sorted order.

When the node drawing program 25 completes the drawing of all recommendation arrows 43, the node drawing program 25 ends the recommendation arrow drawing processing, and returns to the drawing processing explained above with reference to FIG. 7.

Figure 19:
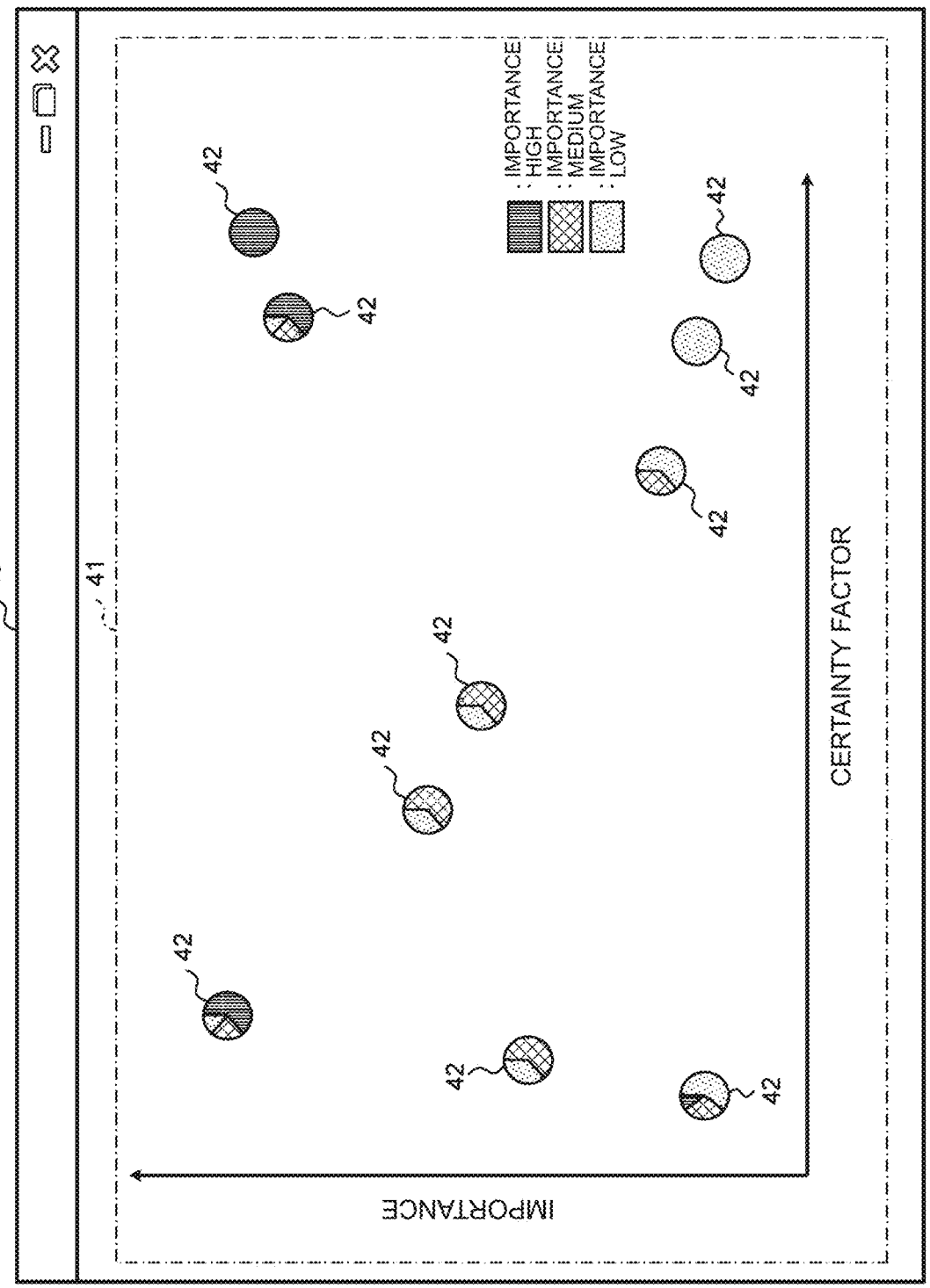
FIG. 19 is a diagram showing another screen configuration example of the new event analysis screen according to the first embodiment.

Note that, in this embodiment, the processing of drawing the recommendation arrow 43 may be omitted. In the foregoing case, the display format will be as shown in FIG. 19. FIG. 19 is configured in the same manner as the new event analysis screen of FIG. 2 excluding the point that the recommendation arrow 43 is not displayed.

(1-4) Effect of this Embodiment

Accordingly, with the event handling task support system 1 of this embodiment, the event analyzing server 6 analyzes the event information of a new event provided from the event management server 4 and, in order to enable the user to recognize, at a glance, the confidence score and importance of the new event based on the analysis, the new event analysis screen 40, in which the nodes 42 corresponding respectively to these new events are arranged on the plane coordinates 41, is generated and displayed on the operator terminal.

Accordingly, by referring to the new event analysis screen 40, the operator can immediately recognize the confidence score and importance of an unknown new event. Furthermore, by displaying the order of new events to be handled by the event analyzing server 6, the operator can handle the new events in the proper order. Thus, according to this embodiment, it is possible to realize a highly useful event handling task support system capable of improving the operator's safety in handling an unknown new event.

(2) Second Embodiment

Figure 18:
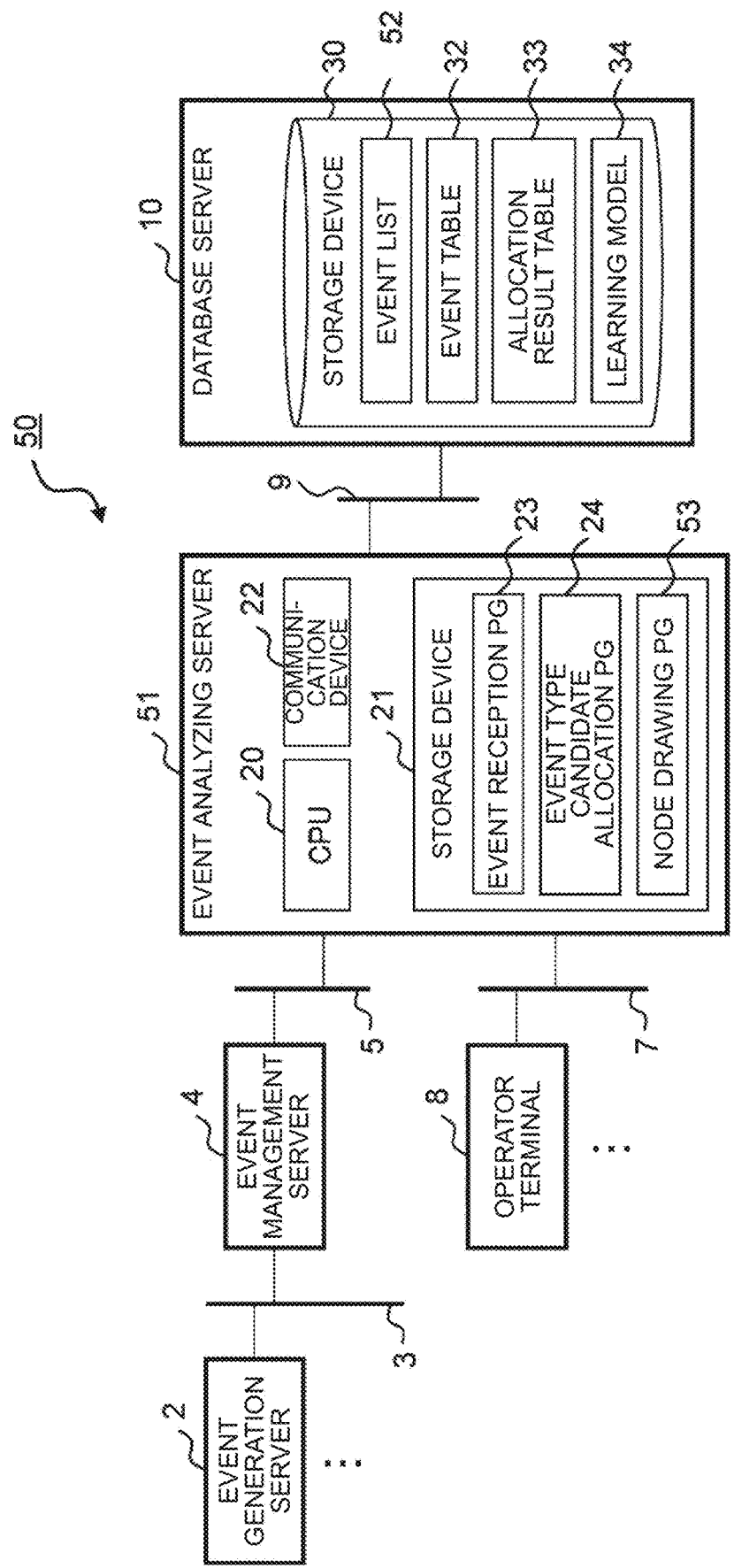
FIG. 18 is a block diagram showing the overall configuration of the event handling task support system according to the second embodiment.

In FIG. 18, the event handling task support system 50 represents the overall event handling task support system according to the second embodiment. The event handling task support system 50 is configured in basically the same manner as the event handling task support system 1 of the first embodiment excluding the point that the event analyzing server 51 generates a new event analysis screen 60 as shown in FIG. 14 and displays the generated new event analysis screen 60 on the operator terminal 8 in substitute for the new event analysis screen 40 explained above with reference to FIG. 2.

Specifically, in the case of the event handling task support system 50 according to this embodiment, the event type list 52 stored in the storage device 30 of the database server 10 is configured by comprising, as shown in FIG. 15, at least an event type ID column 52A and a message template column 52B, and a system importance column 52C and a security importance column 52D.

The event type ID column 52A and the message template column 52B respectively store the same information as the information stored in the event type ID column 31A or the message column 31 B of the event type list 31 of the first embodiment explained above with reference to FIG. 3.

Moreover, the system importance column 52C stores the importance in terms of a system (this is hereinafter referred to as the "system importance") as the first evaluation perspective of the corresponding known event pre-set by the operator in the same manner as the "importance" of the first embodiment, and the security importance column 52D stores the importance in terms of security (this is hereinafter referred to as the "security importance") as the second evaluation perspective of the known event pre-set by the operator in the same manner.

Subsequently, the system analyzing server 51 allocates as the event type candidates, to each new event registered in the event table 32, all known events among the known events registered in the event type list 52 in which the confidence score, which was calculated in the same manner as the first embodiment, is equal to or greater than the foregoing confidence score threshold.

Moreover, the system analyzing server 51 generates the new event analysis screen 60 as shown in FIG. 14 based on the system importance and the security importance of each event type candidate allocated to each new event, and the confidence score. Subsequently, the event analyzing server 51 sends the screen data of the generated new event analysis screen 60 to the relevant operator terminal 8 via the third network 7, and thereby displays the new event analysis screen 60 on the operator terminal 8.

As shown in FIG. 14, the new event analysis screen 60 of this embodiment is configured by comprising plane coordinates 61 in which the vertical axis takes on the security importance and the horizontal axis takes on the system importance. Displayed on the plane coordinates 61 are each new event among the new events corresponding respectively to each event information previously received by the event analyzing server 51 which has not yet been handled by the operator, and the nodes 62 corresponding respectively thereto.

These nodes 62 are configured from a circle graph wherein, as the central coordinate, used is the xy coordinate in which the system importance acquired from the event type list 52 of the event type candidate having the largest confidence score among the event type candidates allocated to the respectively corresponding new events is indicated as the x coordinate, and the security importance acquired from the event type list 52 regarding such event type candidates is indicated as the y coordinate.

In the foregoing case, the circle graph is drawn in a size (radius) which inversely relates to the confidence score of the event type candidate having the highest confidence score among the event type candidates allocated to the corresponding new event. Consequently, a node 62 corresponding to a new event having a low confidence score becomes notable as it will be displayed larger, and the operator can thereby preferentially handle the new event corresponding to that node 62.

Moreover, in the circle graph, an event type candidate having the highest security importance among the event type candidates allocated to the corresponding new event is associated with the inner upper left area (this is hereinafter simply referred to as the "upper left area"), and an event type candidate having the highest system importance among the event type candidates allocated to the corresponding new event is associated with the inner lower right area (this is hereinafter simply referred to as the "lower right area").

Specifically, according to which category among the three categories of "high", "medium" and "low" the value of security importance of the event type candidate having the highest security importance belongs, the upper left area of the circle graph is colored with a color corresponding to the category to which such value belongs or a pattern is indicated according to such category. For example, upon belonging to a category in which the security importance is "high" (for example, the foregoing value is "80" or higher), the upper left area is colored in red, upon belonging to a category in which the security importance is "medium" (for example, the foregoing value is "30" to "79"), the upper left area is colored in orange, and upon belonging to a category in which the security importance is "low" (for example, the foregoing value is "29" or less), the upper left area is colored in green.

Similarly, according to which category among the three categories of "high", "medium" and "low" the value of system importance of the event type candidate having the highest system importance belongs, the lower right area of the circle graph is colored with a color corresponding to the category to which such value belongs or a pattern is indicated according to such category.

Note that, in the example of FIG. 14, while only the nodes 62 are displayed on the plane coordinates of the new event analysis screen 60, in effect, the recommendation arrows 43 explained above with reference to FIG. 2 may also be displayed in the same manner as the first embodiment.

The specific processing contents of the series of processing (event handling task support processing) to be executed by the event analyzing server 50 in relation to the event handling support function according to this embodiment are now explained. Note that, because the overall flow of the event handling task support processing of this embodiment is the same as the event handling task support processing of the first embodiment explained above with reference to FIG. 6, the explanation thereof is omitted.

Moreover, because the flow of the drawing processing to be executed by the node drawing program 53 (FIG. 1) of this embodiment in step S3 (FIG. 6) of the event handling task support processing is also the same as the flow of the drawing processing according to the first embodiment explained above with reference to FIG. 7 excluding the processing contents of the respective steps, the explanation thereof is omitted.

Moreover, because the flow of the respective steps of the coordinate determination processing (FIG. 8) as the processing contents of step S10 is the same excluding the processing contents of step S25, the explanation thereof is omitted.

The processing contents of step S25 are replaced as follows in this embodiment. "The central coordinate is drawn by indicating the system importance of the maximum confidence score system type candidate as x and indicating the security importance of the maximum confidence score system type candidate as y, and the radius shall be a value obtained by dividing a predetermined constant of the system by the confidence score of the maximum confidence score system type candidate." These values will be used in step S57 explained later.

Figure 16:
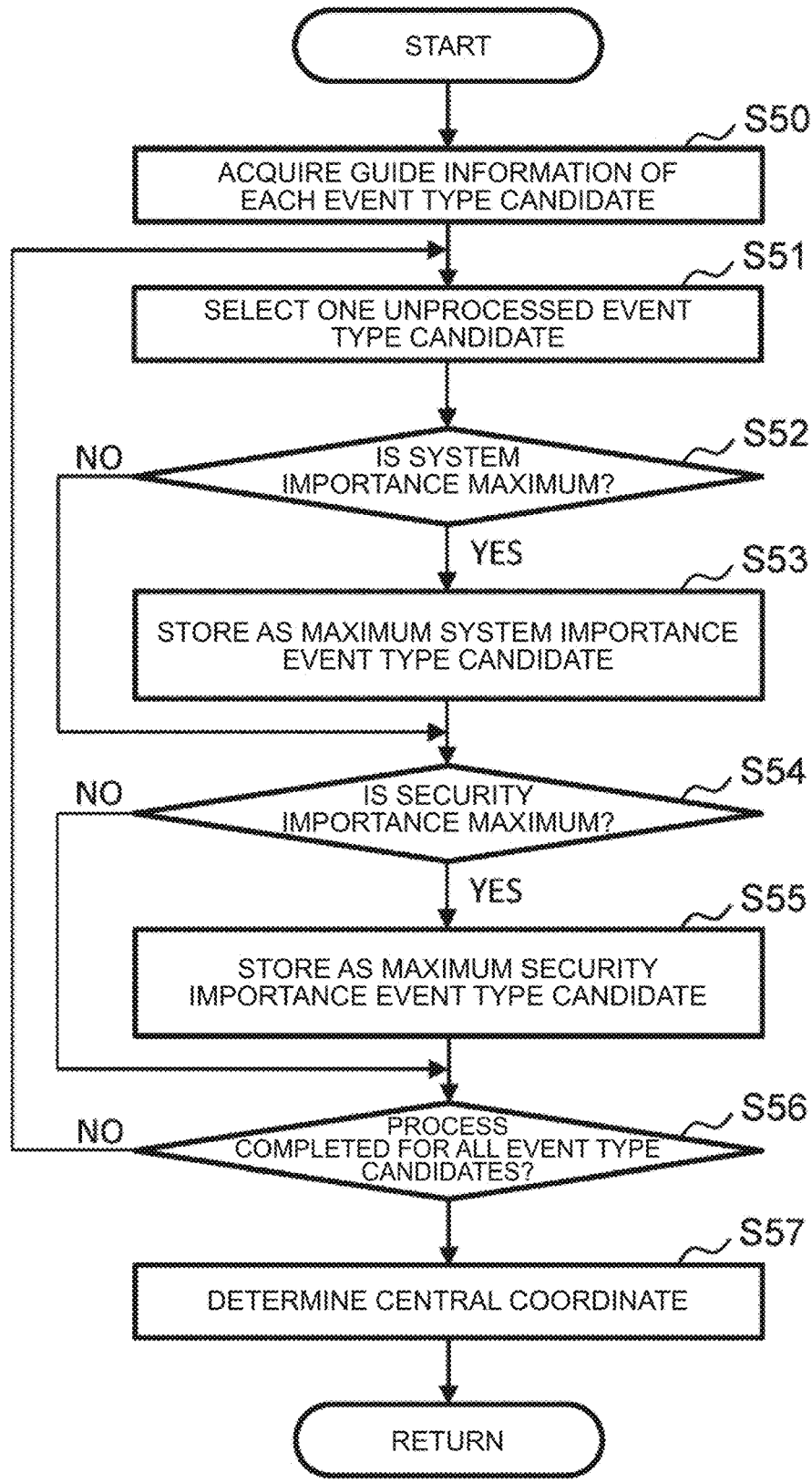
FIG. 16 is a flowchart showing the processing routine of the node drawing processing according to the second embodiment.

FIG. 16 shows the specific processing contents of the node drawing processing to be executed by the node drawing program 53 of this embodiment in step S11 of the drawing processing of FIG. 7.

When the node drawing program 53 of this embodiment advances to step S11 of the drawing processing, the node drawing program 53 starts the node drawing processing shown in FIG. 16, and foremost acquires, from the event type list 52 of the database server 10, the event master information of each event type candidate allocated to the new event (selected new event) selected in step S1 of FIG. 6. Furthermore, the node drawing program 53 initializes the maximum system importance event type candidate to be used in step S53 and the maximum security importance event type candidate to be used in step S55 (S50).

Subsequently, the node drawing program 53 selects one event type candidate which has not yet undergone the processing of step S52 onward among the respective event type candidates in which the event master information was read in step S50 (S51). Moreover, the node drawing program 53 determines "whether the maximum system importance event type candidate is in an initialized state, or whether the system importance of the event type candidate selected in step S51 is maximum among the event type candidates selected in step S51 up until now from the time that the maximum system importance event type candidate was initialized in step S50" (S52). When the node drawing program 53 obtains a NO in the foregoing determination, the node drawing program 53 proceeds to step S54.

Meanwhile, when the node drawing program 53 obtains a YES in the determination of step S52, the node drawing program 53 stores the event type ID and the system importance of the event type candidate selected in step S51 as the system importance of the event type candidate in which the system importance is maximum (in the present invention, this is hereinafter referred to as the "maximum system importance event type candidate") (S53).

Next, the node drawing program 53 determines "whether the maximum security importance event type candidate is in an initialized state, or whether the security importance of the event type candidate selected in step S51 is maximum among the event type candidates selected in step S51 up until now from the time that the maximum security importance event type candidate was initialized in step S50" (S54). When the node drawing program 53 obtains a NO in the foregoing determination, the node drawing program 53 proceeds to step S56.

Meanwhile, when the node drawing program 53 obtains a YES in the determination of step S54, the node drawing program 53 stores the event type ID and the security importance of the event type candidate selected in step S51 as the security importance of the event type candidate in which the security importance is maximum (in the present invention, this is hereinafter referred to as the "maximum security importance event type candidate") (S55).

Furthermore, the node drawing program 53 determines whether the processing of step S52 to step S55 has been executed for all event type candidates allocated to the selected new event (S56). When the node drawing program 53 obtains a NO in the foregoing determination, the node drawing program 53 returns to step S51, and thereafter repeats the processing of step S51 to step S56 while sequentially switching the event type candidate to be selected in step S51 to another event type candidate which has not yet undergone the processing of step S52 onward among the event type candidates allocated to the selected new event.

When the node drawing program 53 obtains a YES in step S56 as a result of completing the processing of step S52 to step S55 for all event type candidates allocated to the selected new event, the node drawing program 53 determines the central coordinate of the node 62 (FIG. 14) corresponding to the selected new event to be drawn on the plane coordinates 61 (FIG. 14) of the new event analysis screen 60 (FIG. 14) as the coordinate position in which the value calculated in step S25; that is, the value stored as the system importance of the maximum system importance event type candidate is indicated as the x coordinate, and the security importance stored as the security importance of the maximum security importance event type candidate is indicated as the y coordinate, and draws, on the plane coordinates 61 (FIG. 14) of the new event analysis screen 60 (FIG. 14), with the coordinate determined based on the foregoing coordinate determination processing as the central coordinate, the nodes 62 represented with a circle having the radius determined based on the foregoing coordinate determination processing in which the lower right half of the circle is drawn using a color or a pattern corresponding to the system importance of the maximum system importance event type candidate calculated in step S53 and the upper left half of the circle is drawn using a color or a pattern corresponding to the security importance of the maximum security importance event type candidate calculated in step S55 (S57). The node drawing program 53 thereafter ends the node drawing processing and returns to "return" subsequent to step S11 of the drawing processing explained above with reference to FIG. 7.

Note that, because the contents of the processing to be subsequently executed by the event analyzing server 51 are the same as first embodiment, the explanation thereof is omitted.

Accordingly, with the event handling task support system 50 of this embodiment, the event analyzing server 51 analyzes the event information of a new event provided from the event management server 4 and, in order to enable the user to recognize, at a glance, the importance from the perspective of a system and the importance from the perspective of security of the new event to be handled based on the analysis, the new event analysis screen 60, in which the nodes 62 corresponding respectively to these new events are arranged on the plane coordinates 61, is generated and displayed on the operator terminal.

Accordingly, by referring to the new event analysis screen 60, the operator can immediately recognize which new event is important from the perspective of a system and which new event is important from the perspective of security, and the operator can thereby properly handle the new event. Thus, according to this embodiment, as with the first embodiment, it is possible to realize a highly useful event handling task support system capable of improving the operator's safety in handling an unknown new event.

(3) Other Embodiments

Note that while the foregoing first and second embodiments explained a case of arranging the event type list 31, 52, the event table 32, the allocation result table 33 and the learning model in the database server, the present invention is not limited thereto, and, for example, the foregoing data may also be allocated to the event analyzing server 6, 51.

Moreover, while the foregoing first and second embodiments explained a case of deleting the entries of each new event in the event table 32 and the allocation result table 33 from the event table 32 and the allocation result table 33 after the operator's handling of the new event is completed, the present invention is not limited thereto, and the entries of the new event that was handled may be left as is without being deleted from the event table 32 and the allocation result table 33. As a result of adopting the foregoing configuration, the operator can confirm past new events.

Figure 17:
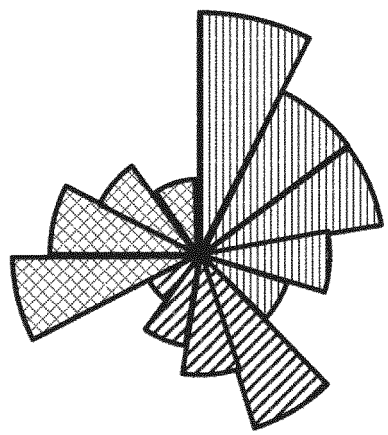
FIG. 17 is a diagram showing a pie-shaped representation method in the first embodiment.

Furthermore, while the foregoing first embodiment explained a case where the node 42 performs drawing as explained above with reference to FIG. 11, the present invention is not limited thereto, and the node 42 may perform drawing, for example, as shown in FIG. 17. Specifically, drawing is performed in each of the pie-shaped areas obtained by dividing the respective areas in the node 42, which correspond respectively to the importance "high" "medium" and "low", by the number of event type candidates corresponding to that node, in a radius according to the confidence score, in the color of each importance, in ascending order from the highest importance, and in ascending order from the highest confidence score.

Furthermore, while the foregoing first and second embodiments explained a case of calculating the importance (candidate importance) of the new event based on the importance (importance, or system importance and security importance) which is pre-set to the event type of each known event, the present invention is not limited thereto, and the importance of the new event may also be calculated according other methods. For example, the importance of the new event may be calculated based on the following formula:

[Math 3]

$$\text{Priority} = \Sigma \text{ (importance of event type} \times \text{confidence score of event type)} \quad (3)$$

INDUSTRIAL APPLICABILITY

The present invention can be broadly applied to a task support system which supports the handling of a new event that occurred in the management target.

REFERENCE SIGNS LIST

1, 50 . . . event handling task support system, 2 . . . event generation server, 4 . . . event management server, 6, 51 . . . event analyzing server, 8 . . . operator terminal, database server, 20 . . . CPU, 21, 30 . . . storage device, 24 . . . event type candidate allocation program, 25, 53 . . . node drawing program, 31, 52 . . . event type list, 32 . . . event table, 33 . . . allocation result table, 40, 60 . . . new event analysis screen, 41, 61 . . . plane coordinates, 42, 62 . . . node, 43 . . . recommendation arrow.

The invention claimed is:

1. A task support system which supports handling of events that occurred in a management target, comprising:
an event type evaluation unit which evaluates, in relation to an unknown event, one or more event types of the event as event type candidates;
a first calculation unit which extracts a first event type candidate group having a high confidence score among the evaluated event type candidates, calculates a first candidate confidence score from a confidence score of each of the event type candidates of the extracted first event type candidate group, and calculates first candidate importance from first importance held by an event type corresponding to each of the event type candidates belonging to the first event type candidate group and information other than the first importance;
a representation unit which represents a diagram corresponding to each of the events in a coordinate space by using the first candidate confidence score and the first candidate importance; and
a second calculation unit which extracts a second event type candidate group, which includes event type candidates having a to confidence score, among the evaluated event type candidates, calculates a second candidate confidence score from a confidence score of each of the event type candidates belonging to the extracted second event type candidate group, and calculates second candidate importance from first importance of an event type corresponding to each of the event type candidates belonging to the second event type candidate group, wherein the representation unit represents the diagram in a graphic format by using the second candidate confidence score and the second candidate importance.

2. The task support system according to claim 1, wherein the representation unit represents the first candidate confidence score and the first candidate importance on two axes of a plane coordinate axis.

3. The task support system according to claim 1, wherein, upon drawing the diagram corresponding respectively to two or more of the events, the representation unit calculates a priority of each of the events based on the first candidate confidence score and the first candidate importance, and draws arrows respectively between each of the diagrams which indicate an order of each of the diagrams from the diagram corresponding to the event in which the priority is high to the diagram corresponding to the event in which the priority is low.

4. The task support system according to claim 1, wherein, upon drawing the diagram corresponding respectively to two or more of the events, the representation unit calculates a priority of each of the events based on the first candidate confidence score and the first candidate importance and based on the second candidate confidence score and the second candidate importance, and draws arrows respectively between each of the diagrams which indicate an order of each of the diagrams from the diagram corresponding to the event in which the priority is high to the diagram corresponding to the event in which the priority is low.

5. The task support system according to claim 1, further comprising:
a third calculation unit, wherewith the event type candidate has second importance based on a second evaluation perspective, which calculates third candidate importance from second importance of an event type corresponding to each of the event type candidates belonging to the first event type candidate group, wherein the representation unit represents the diagram on coordinates by using the first candidate confidence score, the first candidate importance, and the third candidate importance.

6. The task support system according to claim 5, wherein the representation unit sets the first candidate confidence score to be a size of the diagram, and represents the first candidate importance and the third candidate importance on two axes of a coordinate axis.

7. A task support method executed by a task support system which supports handling of an event that occurred in a management target, comprising:
a first step of evaluating, in relation to an unknown event, one or more event types of the event as event type candidates;
a second step of extracting a first event type candidate group having a high confidence score among the evaluated event type candidates, calculating a first candidate confidence score from a confidence score of each of the event type candidates of the extracted first event type candidate group, and calculating first candidate importance from first importance held by an event type corresponding to each of the event type candidates belonging to the first event type candidate group and information other than the first importance; and a third step of representing a diagram corresponding to each of the unknown events in a coordinate space by using the first candidate confidence score and the first candidate importance, wherein, in the second step, a second event type candidate group, which includes event type candidates having a low confidence score, is extracted among the evaluated event type candidates, a second candidate confidence score is calculated from a confidence score of each of the event type candidates belonging to the extracted second event type candidate group, and second candidate importance is calculated from first importance of an event type corresponding to each of the event type candidates belonging to the second event type candidate group, and wherein, in the third step, the diagram is represented in a graphic format by using the second candidate confidence score and the second candidate importance.

8. The task support method according to claim 7,
wherein, in the third step, the first candidate confidence score and the first candidate importance are represented on two axes of a plane coordinate axis.

9. The task support method according to claim 7,
wherein, in the third step, upon drawing the diagram corresponding respectively to two or more of the events, a priority of each of the events is calculated based on the first candidate confidence score and the first candidate importance, and arrows are drawn respectively between each of the diagrams which indicate an order of each of the diagrams from the diagram corresponding to the event in which the priority is high to the diagram corresponding to the event in which the priority is low.

10. The task support method according to claim 7,
wherein, in the third step, upon drawing the diagram corresponding respectively to two or more of the events, a priority of each of the events is calculated based on the first candidate confidence score and the first candidate importance and based on the second candidate confidence score and the second candidate importance, and arrows are drawn respectively between each of the diagrams which indicate an order of each of the diagrams from the diagram corresponding to the event in which the priority is high to the diagram corresponding to the event in which the priority is low.

11. The task support method according to claim 7,
wherein, in the second step, the event type candidate has second importance based on a second evaluation perspective, and third candidate importance is calculated from second importance of an event type corresponding to each of the event type candidates belonging to the first event type candidate group, and wherein, in the third step, the diagram is represented on coordinates by using the first candidate confidence score, the first candidate importance, and the third candidate importance.

12. The task support method according to claim 11,
wherein a representation unit sets the first candidate confidence score to be a size of the diagram, and represents the first candidate importance and the third candidate importance on two axes of a coordinate axis.

\* \* \* \* \*